(12) United States Patent
Batt et al.

(10) Patent No.: US 12,177,271 B2
(45) Date of Patent: Dec. 24, 2024

(54) ENABLING TEMPORARY ACCESS TO A DIGITAL WHITEBOARD DURING A CONFERENCE

(71) Applicant: Zoom Video Communications, Inc., San Jose, CA (US)

(72) Inventors: Palmer Harold Batt, Seattle, WA (US); Alicia Anne-Kepner Brekke, Richmond, VA (US); Jianzhong Ding, Saratoga, CA (US); Seokbin Kang, Santa Clara, CA (US); Stephen George Newton, San Jose, CA (US); Jeffrey William Smith, Layton, UT (US); Jiabin Xiang, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/161,377

(22) Filed: Jan. 30, 2023

(65) Prior Publication Data
US 2024/0259442 A1 Aug. 1, 2024

(51) Int. Cl.
*H04L 65/401* (2022.01)
*H04N 7/15* (2006.01)

(52) U.S. Cl.
CPC ......... *H04L 65/4015* (2013.01); *H04N 7/152* (2013.01)

(58) Field of Classification Search
CPC .............................. H04L 65/4015; H04N 7/152
See application file for complete search history.

(56) References Cited

U.S. PATENT DOCUMENTS

| 10,572,859 | B1* | 2/2020 | Evans ............... H04M 3/42068 |
| 10,956,875 | B2  | 3/2021 | Nelson et al. |
| 11,013,042 | B1* | 5/2021 | Vendrow ............... H04W 76/10 |
| 11,095,693 | B1* | 8/2021 | Wehrung ............ H04L 65/1089 |
| 11,190,642 | B1* | 11/2021 | Yanes ................ H04M 3/4288 |
| 11,212,127 | B2* | 12/2021 | Chanda ............... H04L 65/4015 |
| 11,372,955 | B2  | 6/2022 | Jaber et al. |
| 2018/0103074 | A1 | 4/2018 | Rosenberg |
| 2018/0176207 | A1 | 6/2018 | Malatesha et al. |
| 2018/0176268 | A1 | 6/2018 | Malatesha et al. |
| 2019/0273627 | A1* | 9/2019 | Whalin ................. H04W 4/021 |
| 2021/0334386 | A1* | 10/2021 | AlGhamdi ............. G06F 9/542 |
| 2021/0399911 | A1* | 12/2021 | Jorasch ............... H04L 12/1822 |
| 2022/0417299 | A1* | 12/2022 | Ghosh ................... H04L 65/403 |
| 2023/0035616 | A1* | 2/2023 | Lee ........................ G06F 3/0484 |

\* cited by examiner

*Primary Examiner* — Kristie D Shingles
(74) *Attorney, Agent, or Firm* — Young Basile Hanlon & MacFarlane, P.C.

(57) ABSTRACT

Temporary access to a digital whiteboard is enabled for conference participants during a conference (e.g., a video conference). Based on a request to share a digital whiteboard with conference participants during a conference, ones of the conference participants to which to grant temporary access permissions for the digital whiteboard are determined. The temporary access permissions are granted to enable the ones of the conference participants to access the digital whiteboard during the conference. Based on an event occurrence, which may, for example, correspond to a termination of the conference or a disconnection of an owner of the digital whiteboard from the conference, the temporary access permissions are revoked to restrict further access to the digital whiteboard by the ones of the conference participants.

20 Claims, 8 Drawing Sheets

ENABLING TEMPORARY ACCESS TO A DIGITAL WHITEBOARD DURING A CONFERENCE

FIELD

This disclosure relates to digital whiteboards, and, more specifically, to enabling temporary access to a digital whiteboard, such as for conference participants during a conference, such as a video conference.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
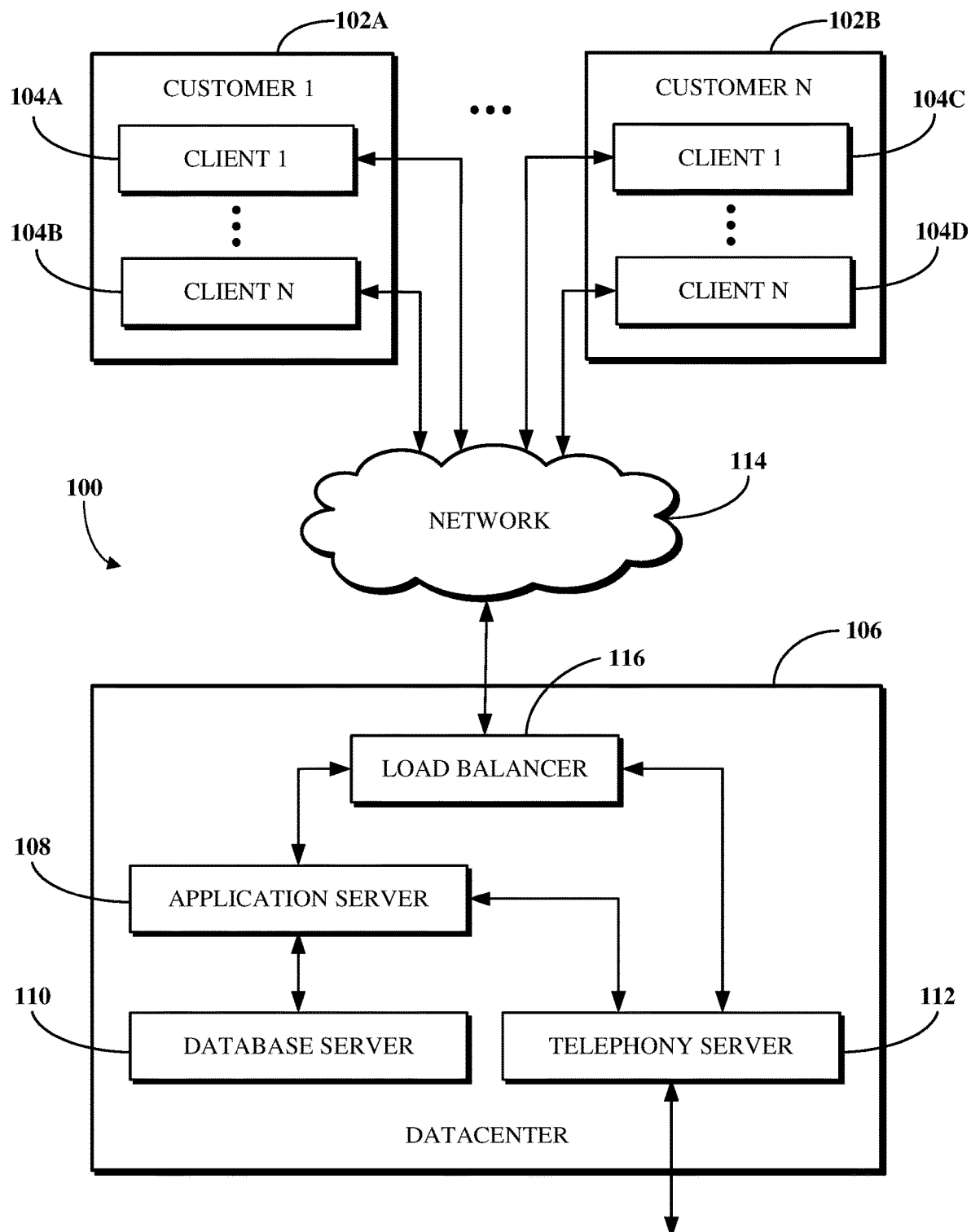
FIG. 1 is a block diagram of an example of an electronic computing and communications system.

A digital whiteboard is a virtual space within which a number of people can collaborate on a project. Users of a digital whiteboard may collaborate by adding, modifying, and/or removing content (e.g., text boxes, drawing spaces, and sticky notes) for current or future consideration by themselves or others. Users of a digital whiteboard may access a digital whiteboard individually, or they may participate in an active digital whiteboard session (i.e., a real-time event in which a digital whiteboard is simultaneously accessed by multiple users) to create documents, brainstorm ideas, and otherwise work together towards a project goal. For example, users of a digital whiteboard may participate in an active digital whiteboard session via a video conference, in which the users are participants to the video conference and the digital whiteboard is shared to the video conference to facilitate the active digital whiteboard session.

A video conference to which a digital whiteboard can be shared to facilitate an active digital whiteboard session enables video-based, real-time communications between participants in one or more locations. In some cases, each of the participants separately connects to a video conference from their own remote locations. In other cases, multiple participants may be physically located in and connect to the video conference from a conference room or similar physical space (e.g., in an office setting) while other conference participants connect to the video conference from one or more remote locations. Conferencing software for implementing a video conference thus enables people to conduct video conferences without requiring them to be physically present with one another. The conferencing software may be available as a standalone software product or it may be integrated within a software platform, such as a unified communications as a service (UCaaS) platform.

People join conferences such as video conferences to ideate and solve problems. In some cases, participants to a conference may want to utilize a digital whiteboard which includes content relevant to the conference. However, one or more other participants to the conference may not have access to the digital whiteboard. For example, some participants to a conference may be from an organization or team separate from the one with which the owner of a digital whiteboard works. In another example, a participant may be a stakeholder who is not typically required to have access to the digital whiteboard. Conventional digital whiteboard solutions enable an owner of a digital whiteboard to statically and manually grant access permissions for the digital whiteboard to another person. To do so, the owner of the digital whiteboard individually grants access permissions for the digital whiteboard to each participant previously without access to the digital whiteboard. To ensure that participants invited to access the digital whiteboard cannot access it after a certain point in time (e.g., the end of a subject conference), the owner of the digital whiteboard must subsequently manually revoke the access permissions individually granted to the conference participants. For example, a conference participant for whom access permissions for a digital whiteboard are not manually revoked may later be able to access the digital whiteboard without the owner thereof present, placing at risk the security of the digital whiteboard. The static and manual process to enable and subsequently revoke access permissions for every individual who needs to temporarily access a digital whiteboard during a conference can thus result in significant delay and disruption to the conference experience.

Implementations of this disclosure address problems such as these by enabling temporary access to a digital whiteboard during a conference, such as a video conference. A request to share a digital whiteboard with conference participants during a conference is initiated at a participant device connected to the conference, such as a device used by an owner of the digital whiteboard. Based on that request, ones of the conference participants to which to grant temporary access permissions for the digital whiteboard are determined. For example, a list of conference participants of the conference may be determined and enforced against the digital whiteboard to determine, based on prior grants of access permissions for the digital whiteboard, which participants on the list are without access permissions for the digital whiteboard. The temporary access permissions are then granted to enable the ones of the conference participants to access the digital whiteboard during the conference. Thereafter, at some point during or after the conference, an event occurrence is detected. The event occurrence may, for example, be associated with the digital whiteboard or the conference, and in particular examples may correspond to a termination of the conference or a disconnection of an owner of the digital whiteboard from the conference. Based on the event occurrence, the temporary access permissions are revoked to restrict further access to the digital whiteboard by the ones of the conference participants.

To describe some implementations in greater detail, reference is first made to examples of hardware and software structures used to implement a system for enabling temporary access to a digital whiteboard. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform or other software platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server (e.g., a virtual machine). In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
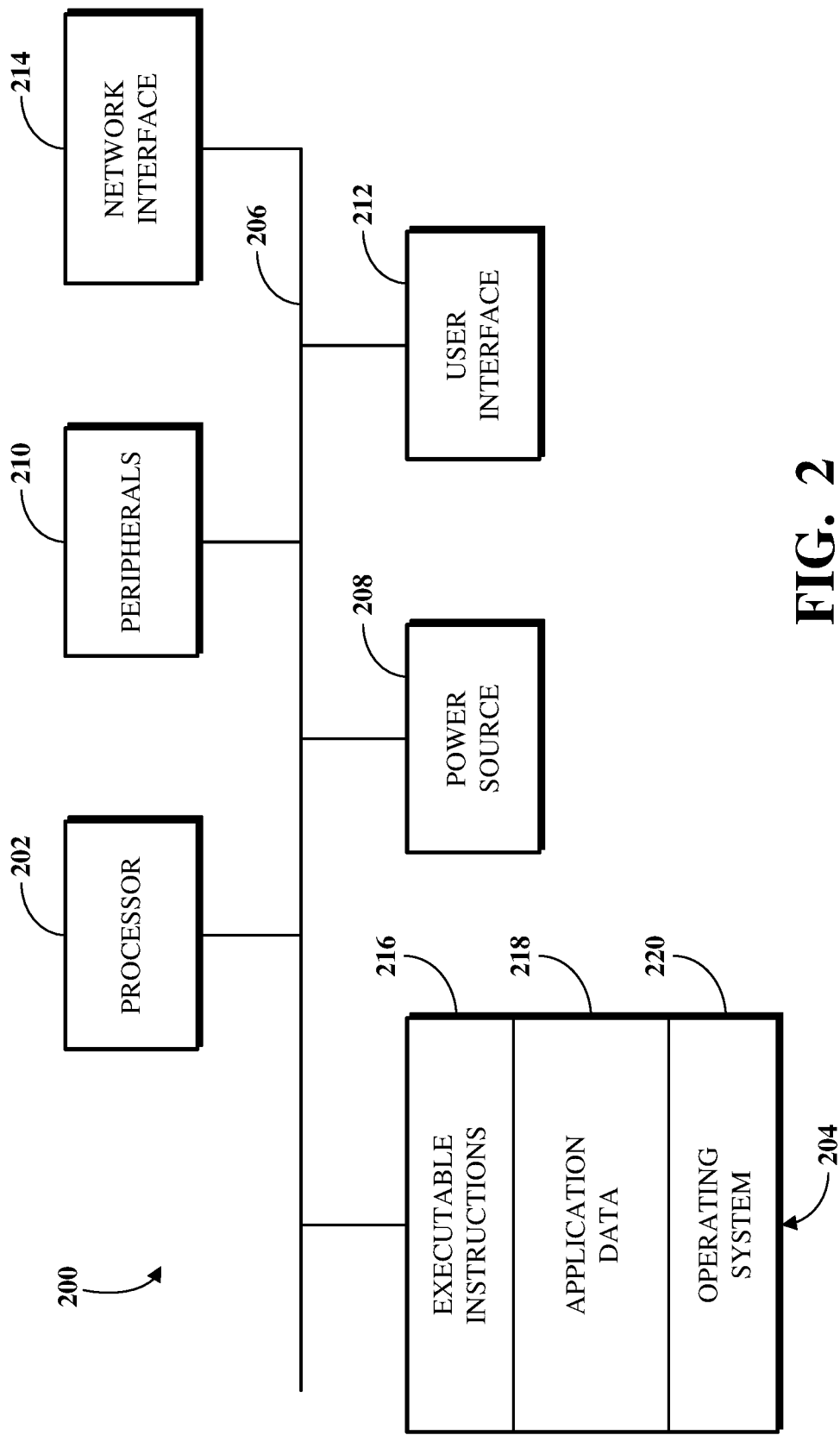
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
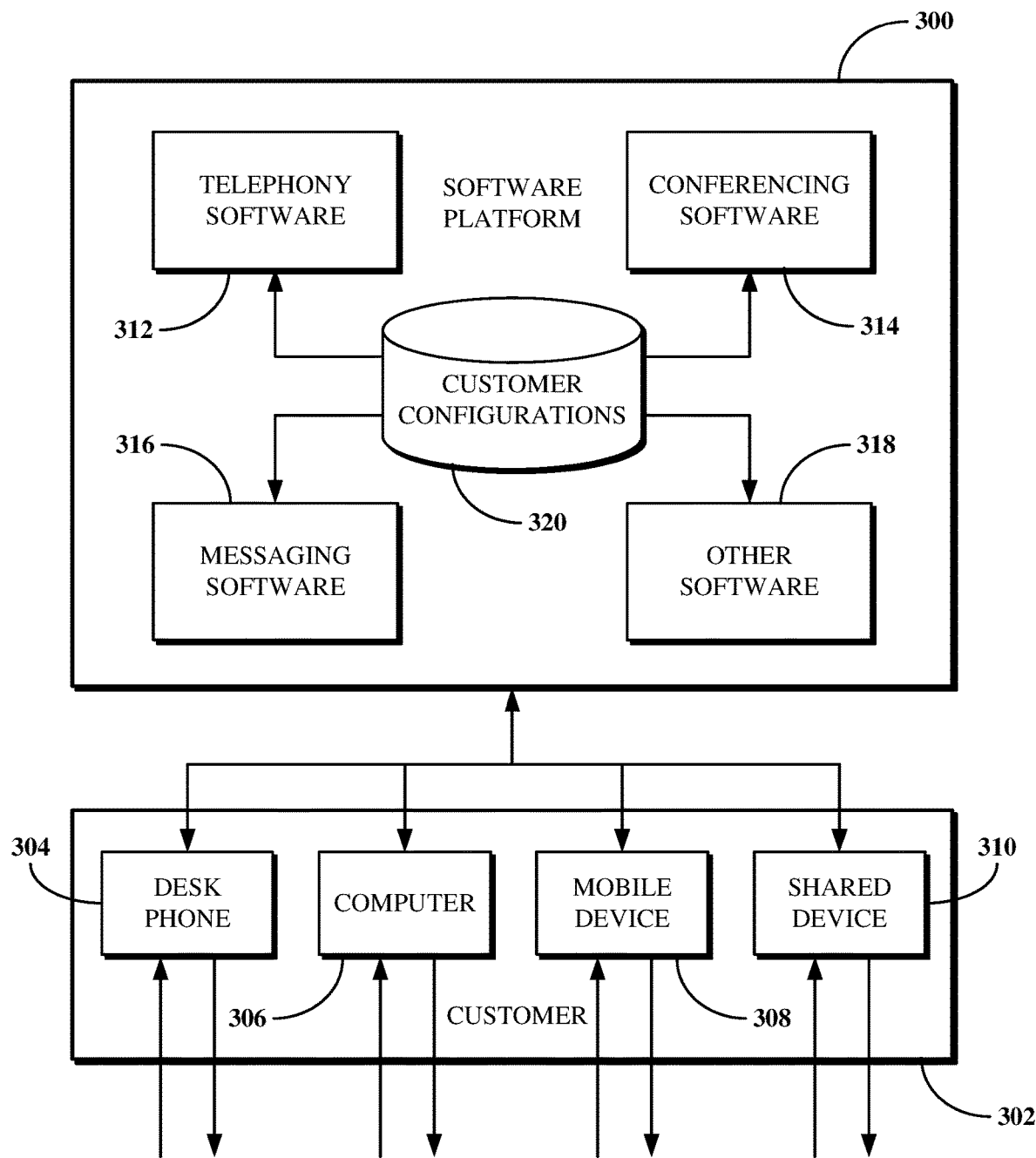
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include digital whiteboard software for accessing and using a digital whiteboard and/or software for enabling temporary access to a digital whiteboard, such as during a conference (e.g., a video conference).

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
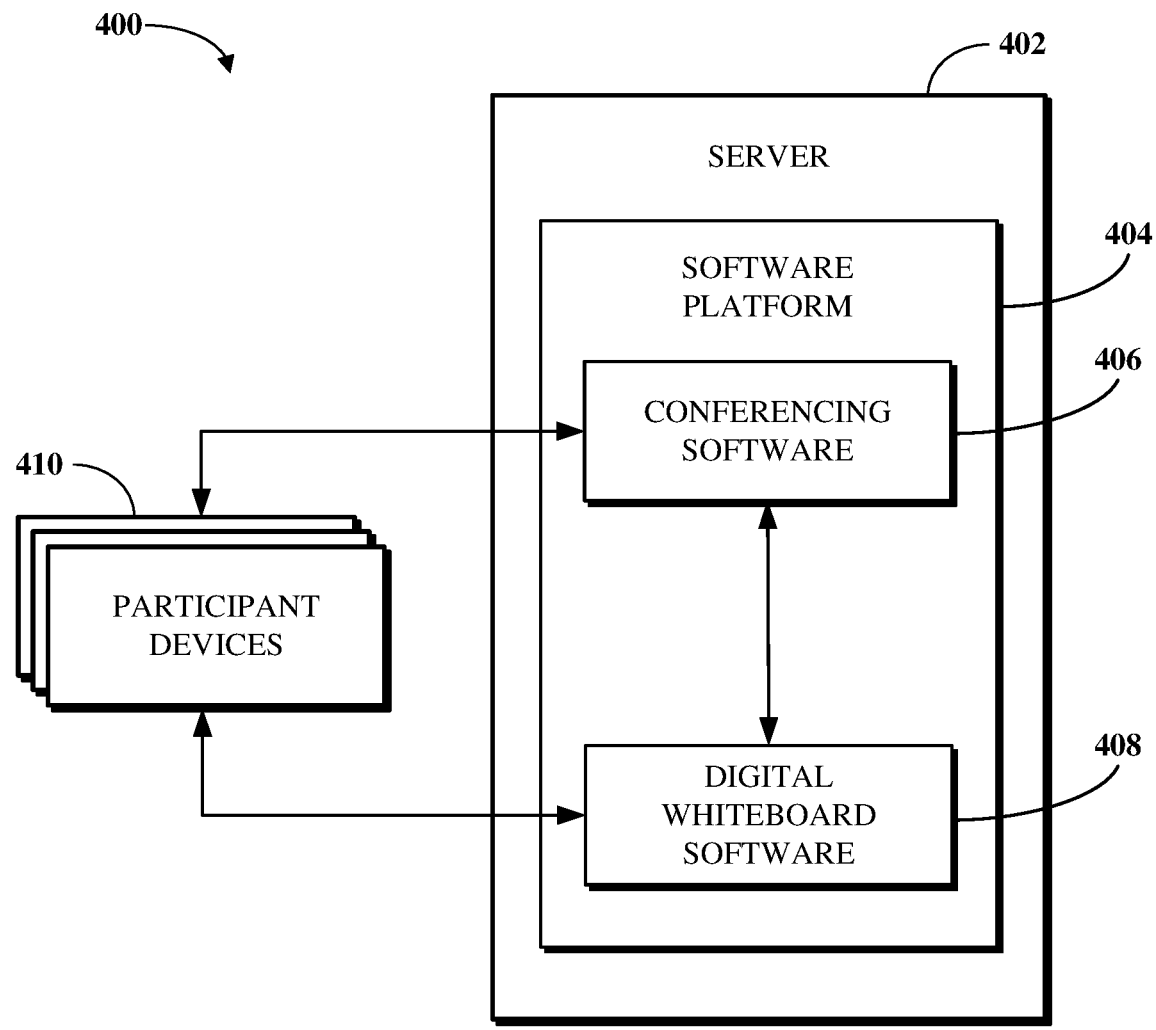
FIG. 4 is a block diagram of an example of a system for sharing a digital whiteboard to a video conference.

FIG. 4 is a block diagram of an example of a system 400 for sharing a digital whiteboard to a video conference. The system 400 includes a server 402 which operates some or all of a software platform 404, which may, for example, be the software platform 300 shown in FIG. 3. As shown, the server 402 operates conferencing software 406 of the software platform 404 and digital whiteboard software 408 of the software platform 404. The conferencing software 406 may, for example, be the conferencing software 314 shown in FIG. 3. The digital whiteboard software 408 may, for example, be the other software 318 shown in FIG. 3. While the conferencing software 406 and the digital whiteboard software 408 are shown as being run on the server 402, in some implementations, the conferencing software 406 and the digital whiteboard software 408 may be run on different servers. In some implementations, the software platform 404 may be omitted.

A number of participant devices 410 are shown. The participant devices 410 are computing devices configured to access a video conference implemented using the conferencing software 406 and/or a digital whiteboard implemented using the digital whiteboard software 408. For example, the participant devices 410 may be client devices, such as ones of the client devices 304 through 310 shown in FIG. 3. A participant device 410 that is a client device may run a client application configured to connect the participant device 410 to a video conference and/or to a digital whiteboard. In another example, the participant devices 410 may be computing devices other than client devices. A participant device 410 that is a computing device other than a client device may use software other than a client application (e.g., a web browser) to connect to a video conference and/or to a digital whiteboard.

The conferencing software 406 implements a video conference over which users of the participant devices 410 can interact in real-time. Implementing a conference includes transmitting and receiving video, audio, and/or other data between the participant devices 410. Each of the participant devices 410 may connect to the conferencing software 406 using separate input streams to enable the users of the participant devices 410 to participate in a video conference together. The various channels used for establishing connections between the participant devices 410 may, for example, be based on the individual device capabilities of the participant devices 410.

The conferencing software 406 includes a user interface tile for each input stream received and processed at the conferencing system 400. An arrangement of the user interface tiles, as well as the sizes of those user interface tiles, may be based on one or both of a type of video conference implemented using the conferencing software 406 (e.g., a participant-to-participant video conference, a contact center engagement video conference, or an online learning video conference, as will be described below) or whether some content is currently being shared to the video conference (e.g., a digital whiteboard, as will be described below).

A conference implemented using the conferencing software 406 may be referred to as a video conference in which video streaming is enabled for the conference participants thereof. The enabling of video streaming for a participant of a video conference does not require that the participant activate or otherwise use video functionality for participating in the video conference. For example, a conference may still be a video conference where none of the participants joining using clients turns on their video stream for any portion of the conference or where video input is disabled for some or all of the participants.

The video conference may be implemented in any of a variety of possible use cases. For example, the video conference can be a participant-to-participant video conference in which participants as end users of the conferencing software 406 may have their own user interface tiles and video streams, connect from their own participant devices (e.g., the participant devices 410), have similar meeting controls, be a host or be granted host permissions, or the like. A participant-to-participant video conference as referred to herein may thus be recognized as a conventional video conference between two or more given people. In another example, the video conference can be a contact center engagement video conference in which one participant to the video conference is a contact center user who is accessing a contact center over a video modality facilitated wholly or partially using the conferencing software 406 and another participant to the video conference is a contact center agent who works with or otherwise for the contact center to address queries from contact center users. In some such cases, the video conference can be implemented within a contact center service to deliver real-time communications over a video modality of the contact center. In yet another example, the video conference can be an online learning video conference in which multiple participants are recognized generally as audience participants and one or more select participants are recognized generally as leader participants. An online learning video conference may, for example, be used for educational purposes (e.g., virtual classes for online-capable schools), webinar purposes, or other lecture- or presentation-type purposes. Other examples of video conference implementations are possible.

The digital whiteboard software 408 implements a digital whiteboard which may be simultaneously accessed by one or more of the participant devices 410. The digital whiteboard software 408 may facilitate an active digital whiteboard session for users of the participant devices 410 to simultaneously collaborate together on a digital whiteboard shared to (and thus during) a video conference implemented using the conferencing software 406. In some cases, the active digital whiteboard session may be initiated while the users of the participant devices 410 are already connected to a video conference implemented using the conferencing software 406. In other cases, the users of the participant devices 410 may be connected to the active digital whiteboard session before a video conference between those users begins. Thus, the digital whiteboard may exist before the video conference to which it is shared begins, or the digital whiteboard may be created during that video conference.

A digital whiteboard implemented using the digital whiteboard software 408 may be accessed and interacted with by some or all of the participant devices 410 at a given time. For example, one or more of the participant devices 410 may be used to add content items to the digital whiteboard, modify content items within the digital whiteboard, and/or remove content items from the digital whiteboard. Changes to (e.g., additions, modifications, and/or removals of) content items of the digital whiteboard made by one of the participant devices 410 are visible in real-time to all of the participant devices 410. As used herein, a content item is, includes, or otherwise refers to an item of content which may be visually represented in some way within a digital whiteboard. Examples of content items include, but are not limited to, text objects, such as text boxes and digital sticky notes, and non-text objects, such as illustrations and flowcharts. A user of a participant device 410 accesses a digital whiteboard using access permissions granted to that user. The access permissions control both the ability of the user of the participant device 410 to access the digital whiteboard as well as the functionality of the digital whiteboard to which the user has access. As such, users of the participant devices 410 may have varying levels of access to functionality of the digital whiteboard based on their access permissions. For example, a user of a participant device 410 may be an owner of the digital whiteboard (i.e., a person who created or who otherwise inherited master control of the digital whiteboard) who retains a highest level of access permissions allowing them to add, modify, and remove content items, comments, and the like without limitation. In another example, a user of a participant device 410 may have access permissions to add content items and to modify or remove the content items that they themselves added, but not to modify or remove content items from other users. In yet another example, a user of a participant device 410 may have comment-only or view-only access permissions preventing them from adding, modifying, or removing content items whatsoever while still allowing them to view the content items in the digital whiteboard. The access permissions which a user of a participant device 410 has for the digital whiteboard may be based on their role within the digital whiteboard. For example, the user of the participant device 410 which has access permissions allowing the user to add, modify, and/or remove content items within the digital whiteboard may be assigned the "editor" role, while the user of the participant device 410 which has access permissions allowing the user to add, modify, and/or remove comments only may be assigned the "commenter" role. A user of a participant device 410 may thus obtain access permissions for the digital whiteboard according to the digital whiteboard role to which they are assigned.

However, one or more users of the participant devices 410 may not have access permissions for the digital whiteboard when the digital whiteboard is shared to the conference in which they are participating. For example, a subset of the conference participants may have previously been granted access permissions for the digital whiteboard based on their use of the digital whiteboard before the conference began, while the remaining conference participants have not previously been granted access permissions for the digital whiteboard because they have not yet used it. In another example, a subset of the conference participants may have access permissions for the digital whiteboard based on those conference participants being members of a team, an entity, an organization, or another group for which the digital whiteboard has been used prior to the conference, while the remaining conference participants may not be members thereof (e.g., as determined based on the a domain associated with those remaining conference participants or based on an organizational chart or like document specifying roles or positions of those remaining conference participants within an entity or organization).

According to the implementations of this disclosure, access permissions may be temporarily granted to participants of a conference (i.e., participant device users) without access permissions for a digital whiteboard shared to the conference to allow those participants to access the digital whiteboard. The digital whiteboard software 408, upon obtaining a request to share a digital whiteboard to a conference, may determine which participants of the conference are without access permissions for the digital whiteboard. For example, those participants may be associated with a team or entity other than the team or entity with which the owner of the digital whiteboard is associated. The owner of the digital whiteboard, as a user of one of the participant devices, can specify whiteboard roles for the participants without access permissions to be assigned during the conference. The digital whiteboard software 408, based on the input from the participant device 410 of the owner of the digital whiteboard, determines the access permissions to grant to each of the subject participants.

The access permissions granted to participants for a digital whiteboard shared to a conference are temporary in that they are granted specifically for use during the conference. Thus, upon an event occurrence, such as the conference terminating (e.g., ending) or an active digital whiteboard session for the digital whiteboard terminating during the conference, the access permissions temporarily granted to participants are revoked to prevent those participants from further accessing the digital whiteboard or the functionality thereof. In some cases, however, the owner of the digital whiteboard may indicate to make the access permissions granted to a conference participant permanent to allow that conference participant further access to the digital whiteboard. For example, designating access permissions for a conference participant as permanent may in some cases enable that conference participant to later access the digital whiteboard even while the owner of the digital whiteboard is not simultaneously accessing it. The owner of the digital whiteboard may indicate to make access permissions for a conference participant permanent during the conference in which those access permissions were initially granted or after that conference has terminated.

While the implementations of this disclosure are shown and described with respect to conferences, in some implementations, access permissions for a digital whiteboard may be granted to a participant of a communication other than a conference. The communication can be a real-time communication (e.g., a telephone call) or an asynchronous communication (e.g., a chat message conversation, a text message conversation, or an email conversation). For example, where the communication is a chat message conversation, an administrator (e.g., a host or owner) of a chat channel in which the conversation is taking place can invite one or more participants of the conversation to access the digital whiteboard. The administrator may specify whiteboard roles for each invited participant, whether within the invitation thereto or based on a response to the invitation. The digital whiteboard software 408 may then grant the access permissions to the invited participant to enable them to temporarily access the digital whiteboard until an event occurrence (e.g., the active digital whiteboard session terminating or the participant leaving the chat channel), at which time those access permissions may be revoked. In some such cases, the administrator may enforce a policy to grant access permissions to any participant of the chat channel while they remain within the chat channel or otherwise while the chat channel remains active. In this way, new participants who later join the chat channel may automatically be granted access permissions for the digital whiteboard. For example, this may be particularly valuable where the digital whiteboard is used with a team or other group and the chat channel is maintained for that same team or other group. However, because the owner of the digital whiteboard is a user and not the chat channel itself, the digital whiteboard and its contents may remain even after the chat channel has been deleted.

Figure 5:
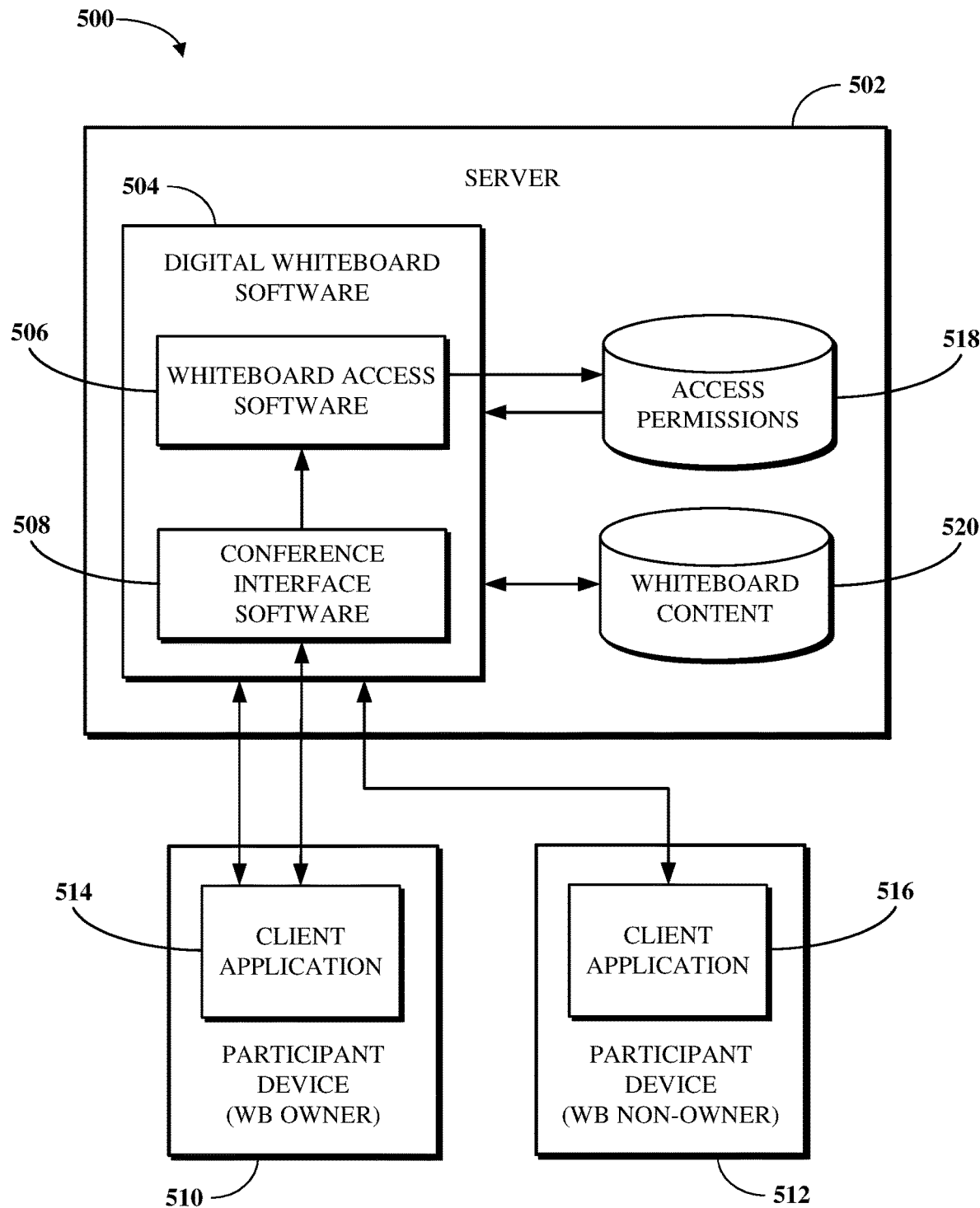
FIG. 5 is a block diagram of an example of a system for enabling temporary access to a digital whiteboard.

FIG. 5 is a block diagram of an example of a system 500 for enabling temporary access to a digital whiteboard. The system 500 may, for example, be the system 400 shown in FIG. 4. The system 500 includes a server 502 that runs digital whiteboard software 504, which may, for example, respectively be the server 404 and the digital whiteboard software 408 shown in FIG. 4. The digital whiteboard software 504 includes whiteboard access software 506 and conference interface software 508. The digital whiteboard software 504 implements a digital whiteboard which may be accessed by conference participants using participant devices, for example, a participant device 510 and a participant device 512. The participant device 510 and the participant device 512 may, for example, each be a participant device 410 shown in FIG. 4.

The digital whiteboard software 504 facilitates an active digital whiteboard session for a digital whiteboard implemented by the digital whiteboard software 504. The participant devices 510 and 512 access the digital whiteboard using client applications running thereat, such as a client application 514 running at the participant device 510 and a client application 516 running at the participant device 512. For example, the client applications 514 and 516 may be different instances or installations of the same software, regardless of versioning. The participant device 510 may also connect to a conference to which the digital whiteboard is shared using the client application 514, in which the conference and the digital whiteboard may be rendered within the same graphical user interface (GUI) or separate GUIs of the client application 514. Similarly, the participant device 512 may also connect to the conference to which the digital whiteboard is shared using the client application 516, in which the conference and the digital whiteboard may be rendered within the same GUI or separate GUIs of the client application 516.

The whiteboard access software 506 controls (e.g., enables and disables) access to a digital whiteboard implemented by the digital whiteboard software 504 by conference participants who previously did not have access thereto. The access granted to a digital whiteboard by the whiteboard access software 506 is temporary such that the access is eventually revoked to restrict further access to the digital whiteboard by the subject conference participants upon an event occurrence. In particular, the whiteboard access software 506 is configured to, based on a request to share a digital whiteboard to a conference (e.g., a video conference), obtain a list of the participants of the conference, determine access levels for conference participants who are without access to the digital whiteboard, grant temporary access permissions to those conference participants according to those access levels, later detect some event occurrence associated with the digital whiteboard, and revoke the temporary access permissions granted to the conference participants based on that event occurrence.

The server 502 further includes an access permissions data store 518 and a whiteboard content data store 520. The access permissions data store 518 stores data indicative of access permissions which are granted for a digital whiteboard. For example, the data stored in the access permissions data store 518 for a given digital whiteboard may indicate names or other identifiers for participant device users who have been granted access permissions for the digital whiteboard and the specific access permissions that have been granted to each of those individual participant device users for the digital whiteboard. The access permissions stored for a given participant device user indicate whether or not that participant device user is allowed to access the digital whiteboard. Where those access permissions indicate that the participant device user is allowed to access the digital whiteboard, the access permissions further indicate the functionality of the digital whiteboard which the participant device user is allowed to access. The functionality of the digital whiteboard is or otherwise corresponds to user actions which can be taken with respect to the digital whiteboard. Examples of such functionality include inviting other participant device users to access the digital whiteboard (i.e., causing new access permissions to be temporarily or permanently granted), assigning whiteboard roles to participant device users, editing (e.g., adding, modifying, and/or removing) content items within the digital whiteboard, editing comments within the digital whiteboard, or viewing the digital whiteboard. Thus, when a request to share a digital whiteboard to a conference is received, a determination can be made as to which conference participants have or do not have access permissions for the digital whiteboard. In some implementations, the access permissions may not indicate whether a given participant device user is allowed to access the digital whiteboard. In such a case, an implication may be made that the participant device user is allowed to access the digital whiteboard based on the name or other identifier for the participant device user appearing within some data of the access permissions data store 518.

The whiteboard content data store 520 stores data indicative of content of the digital whiteboard, such as content items and comments of the digital whiteboard. For example, the data stored within the whiteboard content data store 520 for a digital whiteboard may correspond to one or more of types of content items within the digital whiteboard (e.g., text box, illustration, flowchart, or sticky note), locations of content items within the digital whiteboard (e.g., as coordinates and/or by sheet), contents of content items within the digital whiteboard (e.g., the text within a text box or sticky note), contents of comments within the digital whiteboard (e.g., text addressing one or more content items), or locations of comments within the digital whiteboard (e.g., based on the content items addressed thereby or the locations thereof). The data stored in the whiteboard content data store 520 for a digital whiteboard is used by the digital whiteboard software 504 to render or otherwise load a digital whiteboard when the digital whiteboard is accessed by a participant device user who has access permissions for the digital whiteboard. Thus, when the digital whiteboard is accessed, the digital whiteboard software 504 accesses the whiteboard content data store 520 to retrieve data to cause the content items and/or comments of the digital whiteboard to populate at their designated locations within the digital whiteboard. The data stored within the whiteboard content data store 520 for a digital whiteboard may be updated in real-time or near real-time while the digital whiteboard is being accessed by one or more participant device users (e.g., during an active digital whiteboard session). Alternatively, data indicative of changes to the digital whiteboard made while the digital whiteboard is being accessed by one or more participant device users may be temporarily cached until those one or more participant device users leave the digital whiteboard (e.g., upon a termination of an active digital whiteboard session), at which time the cached data may be stored within the whiteboard content data store 520. While the whiteboard content data store 520 is shown as being in the server 502 along with the digital whiteboard software 504, in some implementations, the whiteboard content data store 520 may instead be in a different server or other computing device. For example, the whiteboard content data store 520 may be maintained within a server in a country in which the owner of the subject digital whiteboard resides to ensure compliance with local data residency requirements.

Figure 6:
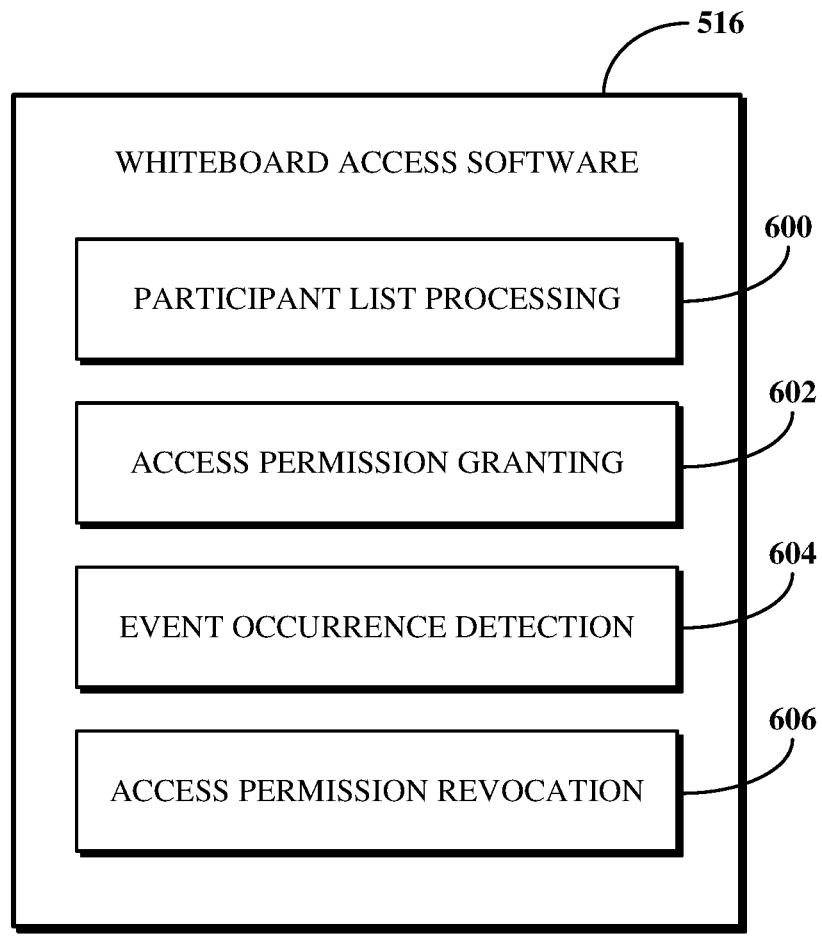
FIG. 6 is a block diagram of an example of whiteboard access software.

The conference interface software 508 serves as an interface between participant devices connected to a conference (e.g., implemented using the conferencing software 406 shown in FIG. 4) and the whiteboard access software 506. For example, where the digital whiteboard is shared within a GUI of the conference, the conference interface software 508 may operate to transmit instructions for rendering the digital whiteboard within the conference GUI output at the participant devices. The conference interface software 508 may also be used to obtain a list of participants of the conference. The list of conference participants obtained using the conference interface software 508 may thereafter be used by the whiteboard access software 506 to grant access permissions. To obtain the list conference participants, the conference interface software 508 uses an application programming interface (API) call to the client application 514 to obtain names of all participants who are connected to the conference. The API call may, for example, be based on (e.g., responsive to) a request to share a digital whiteboard to the conference. The API call by the conference interface software 508 may cause a transmission of the conference participant list to the conference interface software 508 by way of a push mechanism, by which the client application 514 sends the information to the conference interface software 508, or by way of a pull mechanism, by which the conference interface software 508 retrieves the information from the client application 514. While the conference interface software 508 is shown separately from the whiteboard access software 506, in some implementations, the whiteboard access software 506 may include the conference interface software 508. To further describe the whiteboard access software 506, reference is made to FIG. 6, which shows a block diagram of an example of the whiteboard access software 506. The whiteboard access software 506 includes tools, such as programs, subprograms, functions, routines, subroutines, operations, and/or the like, for enabling temporary access to a digital whiteboard, such as for conference participants during a conference. As shown, the whiteboard access software 506 includes a participant list processing tool 600, an access permission granting tool 602, an event occurrence detection tool 604, and an access permission revocation tool 606.

The participant list processing tool 600 obtains a conference participant list for the conference to which the digital whiteboard will be shared and enforces a participant list for the digital whiteboard that mirrors the conference participant list. For example, the participant list processing tool 600 may obtain the conference participant list from the conference interface software 508 shown in FIG. 5. To enforce the participant list for the digital whiteboard, the participant list processing tool 600 accesses a data store (e.g., the access permissions data store 518 shown in FIG. 5) to determine whether all conference participants in the conference participant list have access permissions for the digital whiteboard. As part of this process, the participant list processing tool 600 determines which of those conference participants do not have access permissions for the digital whiteboard, for example, based on data retrieved from the accessed data store corresponding other than to those conference participants.

The access permission granting tool 602 grants access permissions for conference participants to use to temporarily access the digital whiteboard. In particular, the access permission granting tool 602 obtains an indication, determined using the participant list processing tool 600, of the conference participants who are without access permissions for the digital whiteboard. Using the indication of those conference participants, the access permission granting tool 602 prompts an owner of the digital whiteboard to define access levels for each of those conference participants. An access level represents a set or subset of functionality of a digital whiteboard to which a conference participant may have or otherwise be granted access. The access levels may be correlated to whiteboard roles available for the digital whiteboard. For example, the access level for a participant device user may be one of owner, editor, commenter, or view-only. In one example use case, the owner of the digital whiteboard may set access levels for conference participants from an external organization (e.g., an organization different from the one to which the owner of the digital whiteboard belongs) to the view-only access level to prevent those conference participants from editing content of the digital whiteboard. Alternatively, the access level may be independent of whiteboard roles, such as where they correspond to sets or subsets of the digital whiteboard functionality individually or collectively chosen for the subject participant device owner (e.g., by the owner of the digital whiteboard). In one example use case, the owner of the digital whiteboard may set an access level for a conference participant from another team (e.g., a team different from the one to which the owner of the digital whiteboard belongs) to enable the conference participant to add new content items or comments into the digital whiteboard but to restrict the conference participant from modifying or removing content items or comments within the digital whiteboard.

The access permission granting tool 602 determines access permissions to grant to each of the conference participants based on the access levels defined by the owner of the digital whiteboard. To enable the conference participants to access the digital whiteboard and applicable functionality thereof, the access permission granting tool 602 stores data indicative of the access permissions granted for each of the conference participants within a data store (e.g., the access permissions data store 518). Once the access permissions are stored in the data store, the digital whiteboard software implementing the digital whiteboard to share to the conference (e.g., the digital whiteboard software 504 shown in FIG. 5) retrieves the stored data to cause the conference participants who were granted temporary access to connect to the digital whiteboard. For example, once the access permissions are granted for a conference participant, the digital whiteboard software can makes an API call to a client application running at a participant device of that conference participant (e.g., the client application 516 shown in FIG. 5) to cause the client application to connect to the digital whiteboard and to render the digital whiteboard within a GUI of that client application.

The event occurrence detection tool 604 detects an event occurrence associated with the digital whiteboard at some point after the access permissions are granted to the conference participants by the access permission granting tool 602. The event occurrence may relate to the digital whiteboard, the conference to which the digital whiteboard is shared, one or more conference participants accessing the digital whiteboard, and/or an active digital whiteboard session initiated for the sharing of the digital whiteboard to the subject conference. For example, the event occurrence may be or correspond to a termination of the conference, such as by the host of the conference ending the conference for all participants. In another example, the event occurrence may be or correspond to a time limit associated with the digital whiteboard elapsing, such as a timer set for a brainstorming or like activity within the digital whiteboard expiring. In yet another example, the event occurrence may be or correspond to a change in content of the digital whiteboard, such as content items added during an active digital whiteboard session within the conference being removed from the digital whiteboard. In still a further example, the event occurrence may be or correspond to the owner of the digital whiteboard disconnecting from the digital whiteboard and/or from the conference. The event occurrence detection tool 604 detects an event occurrence using a set of rules defining the various possible event occurrences. For example, the rules may be defined by the owner of the digital whiteboard or the host of the conference, to the extent different. In another example, the set of rules may be defined by a policymaker associated with a team, entity, or organization with which the owner of the digital whiteboard is associated. The event occurrence detection tool 604 may, for example, use an interface to conferencing software used to implement the conference (e.g., the conference interface software 508 shown in FIG. 5) to listen for information indicative of event occurrences.

The access permission revocation tool 606 revokes the temporary access permissions granted by the access permission granting tool 602 based upon (e.g., upon or otherwise responsive to) an event occurrence detected by the event occurrence detection tool 604. The access permission revocation tool 606 revokes the temporary access permissions to restrict further access to the digital whiteboard by the conference participants to whom the temporary access permissions were granted. Revoking the temporary access permissions can include deleting data indicative of those access permissions from within a data store (e.g., the access permissions data store 518). Where the event occurrence is detected before an active digital whiteboard session for the digital whiteboard ends (e.g., while the conference participants are still connected to the digital whiteboard), revoking the temporary access permissions can include terminating the active digital whiteboard session as well as deleting the data indicative of the access permissions from within a data store.

In some implementations, the owner of the digital whiteboard may designate the temporary access permissions granted for one or more conference participants as permanent access permissions for the digital whiteboard. In such a case, the access permission revocation tool 606 does not revoke the permanent access permissions for those one or more conference participants upon the detection of the event occurrence.

In some implementations, the conference may be an occurrence of a recurring conference with one or more future occurrences scheduled for later dates. In some such cases, the access permission revocation tool 606 does not revoke the temporary access permissions granted to the conference participants during the conference upon the event occurrence, but instead updates those access permissions to restrict a further access to the digital whiteboard except while the owner of the digital whiteboard is also accessing the digital whiteboard and/or during further occurrences of the recurring conference. For example, the update to the access permissions may enforce an access schedule consistent with the dates and times of the future occurrences of the recurring conference and a time-to-live policy for revoking the access permissions upon a termination of a final one of those future occurrences. In other such cases, the access permission revocation tool 606 does not revoke the temporary access permissions granted to the conference participants during the conference upon the event occurrence to instead allow the conference participants to continue accessing the digital whiteboard even outside of such future occurrences of the recurring conference. The temporary access permissions may thus persist for future occurrences of the recurring conference.

In some implementations, one or more of the conference participants who are granted the temporary access permissions may be allowed to continue accessing the digital whiteboard after the event occurrence is detected, regardless of whether the conference is an occurrence of a recurring conference. For example, where the event occurrence is or corresponds to the owner of the digital whiteboard disconnecting from the digital whiteboard and/or the conference, one or more of those conference participants may be allowed to continue accessing the digital whiteboard until the active digital whiteboard session and/or the conference terminates.

In some implementations, the event occurrence detection and the access permission revocation may be specific to an individual conference participant to whom temporary access permissions were granted. For example, the event occurrence detection tool 604 may detect an event occurrence based on a conference participant disconnecting from the conference to which the digital whiteboard is shared, and the access permission revocation tool 606 may accordingly revoke the access permissions granted to that conference participant alone. Where that happens and the conference participant later reconnects to the conference while the conference remains ongoing, the access permission granting tool 602 may, based on the previous grant of access permissions to the conference participant, automatically re-grant the same access permissions to the conference participant.

Although the tools 600 through 606 are shown as separate tools, in some implementations, two or more of the tools 600 through 606 may be combined into a single tool. Although the tools 600 through 606 are shown as functionality of the whiteboard access software 506 as a single piece of software, in some implementations, some or all of the tools 600 through 606 may exist outside of the whiteboard access software 506. Similarly, in some implementations, a software service using the whiteboard access software 506 (e.g., the digital whiteboard software 408 or the conferencing software 406) may exclude the whiteboard access software 506 while still including the some or all of tools 600 through 606 in some form elsewhere or otherwise make use of the tools 600 through 606 while some or all of the tools 600 through 606 are included in some form elsewhere.

Figure 7:
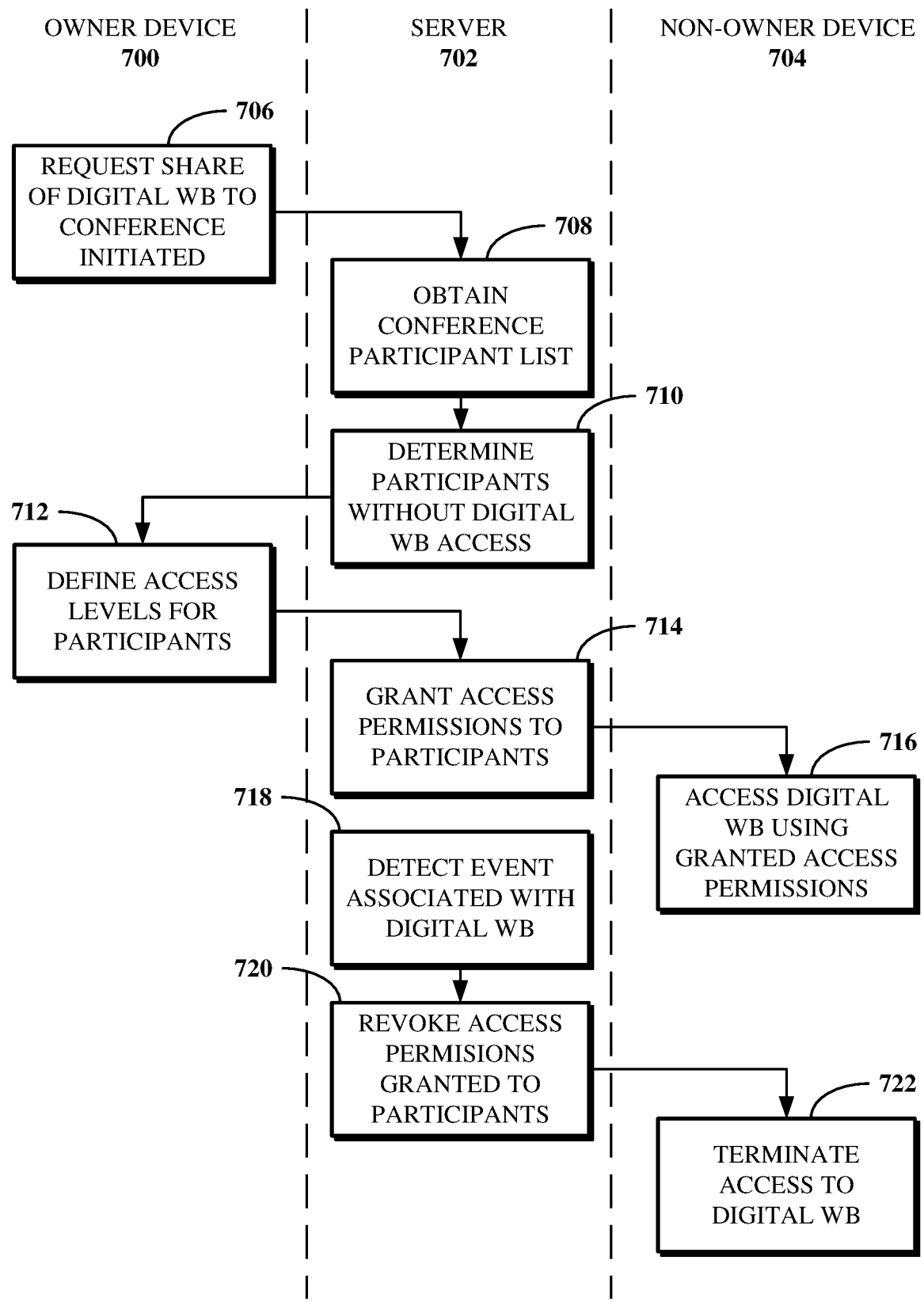
FIG. 7 is an illustration of swim lanes showing an example sequence of operations performed for enabling temporary access to a digital whiteboard.

FIG. 7 is an illustration of swim lanes showing an example sequence of operations performed for enabling temporary access to a digital whiteboard. As shown, the sequence of operations is between an owner device 700, a server 702, and a non-owner device 704. The owner device 700 is a participant device used by an owner of a digital whiteboard shared to a conference (e.g., the participant device 510 shown in FIG. 5). The server 702 is a computing device that runs software for enabling temporary access to a digital whiteboard (e.g., the server 502 shown in FIG. 5). The non-owner device 704 is a participant device used by a conference participant other than an owner of a digital whiteboard shared to a conference (e.g., the participant device 512 shown in FIG. 5).

At 706, a request to share a digital whiteboard to a conference (e.g., a video conference) is initiated at the owner device 700. For example, the request to share the digital whiteboard to the conference may be initiated during the conference, such as based on an interaction by a user of the owner device 700 with a GUI element associated with the conference or the digital whiteboard. At 708, based on the request to share the digital whiteboard to the conference, the server 702 obtains a list of the participants to the conference. At 710, the server 702 determines which participants on the conference participant list are without access to the digital whiteboard to be shared to the conference (i.e., which of those participants do not already have access permissions for the digital whiteboard). At 712, the owner device 700 provides input defining access levels for the participants to which to grant temporary access permissions for the digital whiteboard during the conference. At 714, the temporary access permissions are granted at the server 702 to the subject conference participants. At 716, the non-owner device 704, using the access permissions granted to the user thereof, accesses the digital whiteboard shared to the conference. At 718, at some point after the conference participant using the non-owner device 704 accesses the digital whiteboard, the server 702 detects an event occurrence associated with the digital whiteboard. The event occurrence is something that serves as a basis for revoking the temporary access permissions granted to the conference participants. At 720, based on the detected event occurrence, the server 702 revokes the access permissions temporarily granted to the conference participants. In some cases, the revocation can be with respect to some, but not all, of the access permissions granted based on the request to share the digital whiteboard to the conference. At 722, the access by the non-owner device 704 to the digital whiteboard is terminated.

Figure 8:
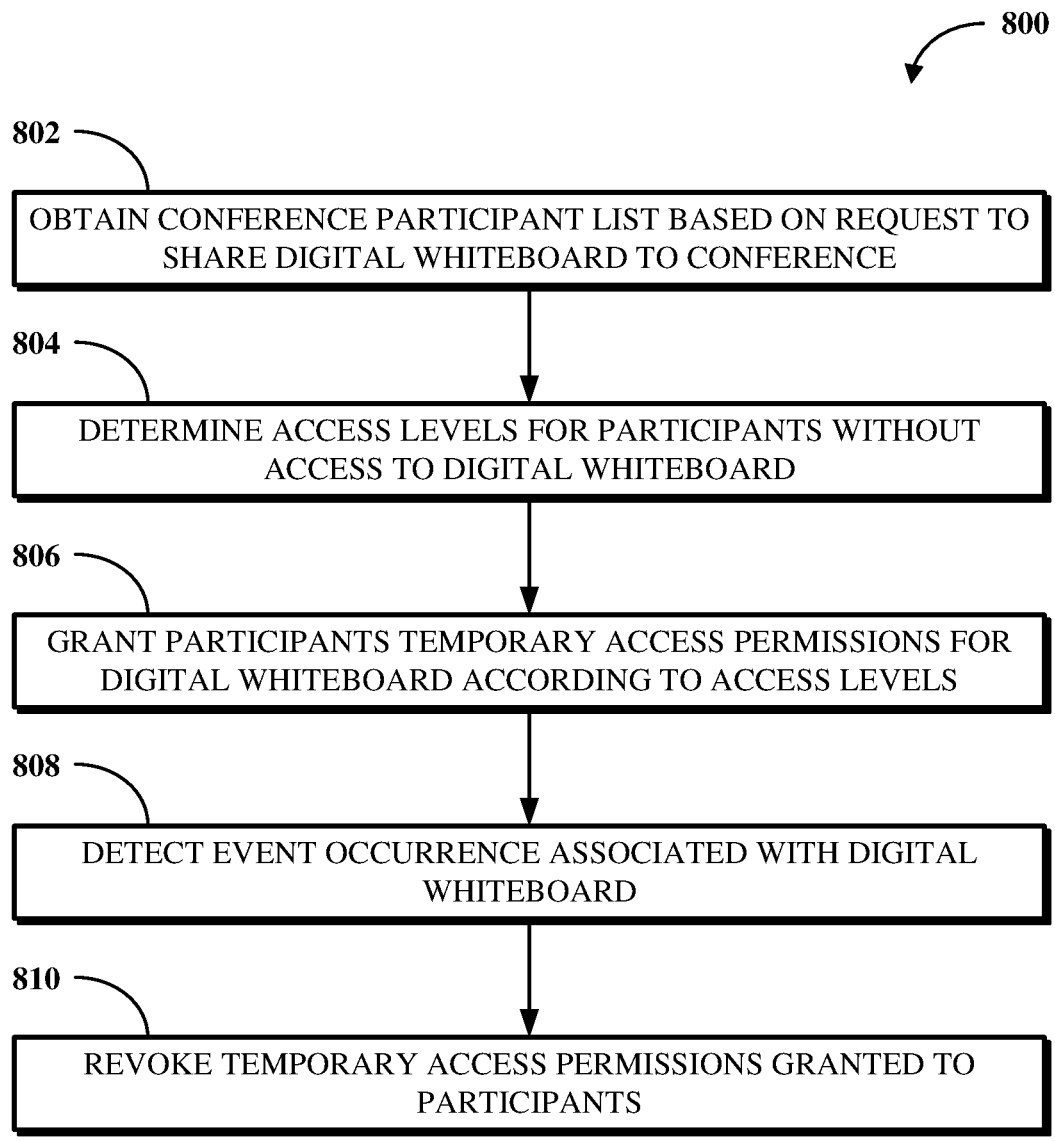
FIG. 8 is a flowchart of an example of a technique for enabling temporary access to a digital whiteboard.

To further describe some implementations in greater detail, reference is next made to examples of techniques which may be performed by or using a system for enabling temporary access to a digital whiteboard. FIG. 8 is a flowchart of an example of a technique 800 for enabling temporary access to a digital whiteboard. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800 and/or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, a conference participant list is obtained based on a request to share a digital whiteboard to a conference (e.g., a video conference). The request to share the digital whiteboard is initiated during the conference by a participant device connected to the conference. For example, the request may be initiated at a participant device used by an owner of the digital whiteboard or of a host of the conference. The conference participant list identifies all participants of the conference according to a name or other identifier by which the participants are represented to others within the conference.

At 804, access levels are determined for conference participants who are without access to the digital whiteboard. Determining the access levels can include determining those conference participants who are without access to the digital whiteboard using the list of conference participants and then prompting the owner of the digital whiteboard or the user of the participant device at which the request to share the digital whiteboard to the conference is initiated to define the access levels for the partitions who are without access to the digital whiteboard. For example, determining the conference participants who are without access to the digital whiteboard can include querying an access permissions data store that stores data indicative of access permissions for the digital whiteboard using the names or other identifiers of the conference participants as indicated within the list of conference participants. Results of the querying can indicate which of those conference participants have already been granted access permissions for the digital whiteboard (i.e., based on their name or other identifier being associated with data stored within the data store). Conference participants for whom the querying did not identify data stored in the data store may be identified as conference participants who are without access permissions for the digital whiteboard. Determining the ones of the conference participants to which to grant the temporary access permissions for the digital whiteboard thus includes enforcing a participant list for the digital whiteboard that matches a list of the conference participants.

At 806, the conference participants for whom the access levels are determined are granted temporary access permissions for the digital whiteboard according to those access levels. Granting the temporary access permissions can include updating the data stored in the access permissions data store to indicate access permissions for the conference participants who did not previously have access permissions. The updated data in the data store is used by software that implements the digital whiteboard to determine that those conference participants now have access to the digital whiteboard. Once the temporary access permissions are granted, the digital whiteboard may be accessed by all of the conference participants during the conference.

At 808, an event occurrence associated with the digital whiteboard is detected. The event occurrence may be detected using agents, scripts, or other software that listens to the software implementing the digital whiteboard and/or software implementing the conference for events defined by a set of rules. The set of rules may be defined by the owner of the digital whiteboard, the host of the conference, another conference participant, or another device user having administrative privileges (e.g., in connection with an entity or organization with which the owner of the digital whiteboard is associated) for use with the digital whiteboard specifically and/or with multiple digital whiteboards. In one particular example, the event occurrence may correspond to a termination of the conference.

At 810, the temporary access permissions granted to the conference participants are revoked based on the event occurrence. Revoking the temporary access permissions includes updating the data stored in the access permissions data store to remove records associated with the conference participants for whom temporary access permissions for the digital whiteboard were granted. For example, the data associated with those conference participants may be marked as being for temporary use, such as using a flag or metadata. Revoking the temporary access permissions may thus include searching the data of the access permissions data store for data which includes that flag or metadata and deleting same upon the event occurrence. Revoking the temporary access permissions restricts further access to the digital whiteboard by the conference participants for whom the temporary access permissions were granted.

The implementations of this disclosure describe methods, systems, devices, apparatuses, and non-transitory computer readable media for automated rearrangement of content within a digital collaboration space. In some implementations, a method comprises, a non-transitory computer readable medium stores instructions operable to cause one or more processors to perform operations comprising, and/or an apparatus comprises a memory and a processor configured to execute instructions stored in the memory for: determining, based on a request to share a digital whiteboard with conference participants during a conference, ones of the conference participants to which to grant temporary access permissions for the digital whiteboard; granting the temporary access permissions to enable the ones of the conference participants to access the digital whiteboard during the conference; and revoking, upon an event occurrence, the temporary access permissions to restrict further access to the digital whiteboard by the ones of the conference participants.

In some implementations of the method, the non-transitory computer readable medium, and/or the apparatus, determining the ones of the conference participants comprises: obtaining, by software facilitating the digital whiteboard, a list of the conference participants from software facilitating the conference.

In some implementations of the method, the non-transitory computer readable medium, and/or the apparatus, granting the temporary access permissions comprises: enforcing a participant list that matches a list of the conference participants.

In some implementations of the method, the non-transitory computer readable medium, and/or the apparatus, granting the temporary access permissions comprises: prompting an owner of the digital whiteboard to define access levels for the ones of the conference participants.

In some implementations of the method, the non-transitory computer readable medium, and/or the apparatus, an owner of the digital whiteboard is associated with a first organization and the ones of the conference participants are associated with a second organization.

In some implementations of the method, the non-transitory computer readable medium, and/or the apparatus, a conference participant of the ones of the conference participants who disconnects from the conference retains the temporary access permissions until the event occurrence.

In some implementations of the method, the non-transitory computer readable medium, and/or the apparatus, the conference is a recurring conference and the temporary access permissions persist for future occurrences of the recurring conference.

In some implementations of the method, the non-transitory computer readable medium, and/or the apparatus, the digital whiteboard is created during the conference.

In some implementations of the method, the non-transitory computer readable medium, and/or the apparatus, the event occurrence corresponds to a termination of the conference.

In some implementations of the method, the non-transitory computer readable medium, and/or the apparatus, the event occurrence corresponds to a time limit associated with the digital whiteboard elapsing.

In some implementations of the method, the non-transitory computer readable medium, and/or the apparatus, the event occurrence corresponds to a change in content of the digital whiteboard.

In some implementations of the method, the non-transitory computer readable medium, and/or the apparatus, determining the ones of the conference participants comprises: comparing a conference participant list for the conference against data stored within an access permissions data store.

In some implementations of the method, the non-transitory computer readable medium, and/or the apparatus, an owner of the digital whiteboard indicates to make the temporary access permissions granted to a conference participant of the ones of the conference participants permanent.

In some implementations of the method, the non-transitory computer readable medium, and/or the apparatus, the event occurrence is associated with one or both of the digital whiteboard or the conference.

In some implementations of the method, the non-transitory computer readable medium, and/or the apparatus, determining the ones of the conference participants comprises: accessing a data store storing digital whiteboard access permissions to determine, based on a list of the conference participants, that the ones of the conference participants are without access permissions for the digital whiteboard.

In some implementations of the method, the non-transitory computer readable medium, and/or the apparatus, determining the ones of the conference participants comprises: using an application programming interface call to a client application running at a participant device of an owner of the digital whiteboard to obtain a list of conference participants for the conference.

In some implementations of the method, the non-transitory computer readable medium, and/or the apparatus, the temporary access permissions are granted based on whiteboard roles defined for the ones of the conference participants.

In some implementations of the method, the non-transitory computer readable medium, and/or the apparatus, the event occurrence corresponds to a disconnection of an owner of the digital whiteboard from the conference.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
   determining, by a computing device and based on a request to share a digital whiteboard with conference participants during a conference provided by a unified communications as a service (UCaaS) platform, temporary access permissions to the digital whiteboard for each of the conference participants, wherein the temporary access permissions are specific to each of the conference participants based on previous access permissions granted to each of the conference participants;
   granting, by the computing device, the temporary access permissions to enable the conference participants to access the digital whiteboard during the conference; and
   revoking, by the computing device and upon an event occurrence, the temporary access permissions, wherein the event occurrence is uniquely defined for each conference participant according to a set of rules based on the digital whiteboard, each conference participant, and the conference.

2. The method of claim 1, comprising:
   obtaining, by software facilitating the digital whiteboard, a list of the conference participants from software facilitating the conference.

3. The method of claim 1, wherein granting the temporary access permissions comprises:
   enforcing a participant list that matches a list of the conference participants.

4. The method of claim 1, wherein granting the temporary access permissions comprises:
   prompting an owner of the digital whiteboard to define access levels for each of the conference participants.

5. The method of claim 1, wherein an owner of the digital whiteboard is associated with a first organization and the conference participants are associated with a second organization.

6. The method of claim 1, wherein a conference participant of the conference participants who disconnects from the conference retains the temporary access permissions until the event occurrence.

7. The method of claim 1, wherein the conference is a recurring conference and the temporary access permissions persist for future occurrences of the recurring conference.

8. The method of claim 1, wherein the digital whiteboard is created during the conference.

9. The method of claim 1, wherein the event occurrence corresponds to a termination of the conference.

10. The method of claim 1, wherein the event occurrence corresponds to a time limit associated with the digital whiteboard elapsing.

11. The method of claim 1, wherein the event occurrence corresponds to a change in content of the digital whiteboard.

12. A non-transitory computer readable medium storing instructions operable to cause one or more processors to perform operations comprising:
    determining, based on a request to share a digital whiteboard with conference participants during a conference provided by a unified communications as a service (UCaaS) platform, temporary access permissions to the digital whiteboard for each of the conference participants, wherein the temporary access permissions are specific to each of the conference participants based on previous access permissions granted to each of the conference participants;
    granting the temporary access permissions to enable the conference participants to access the digital whiteboard during the conference; and
    revoking, upon an event occurrence, the temporary access permissions, wherein the event occurrence is uniquely defined for each conference participant according to a set of rules based on the digital whiteboard, each conference participant, and the conference.

13. The non-transitory computer readable medium of claim 12, wherein the operations further comprise:
    comparing a conference participant list for the conference against data stored within an access permissions data store.

14. The non-transitory computer readable medium of claim 12, wherein an owner of the digital whiteboard indicates to make the temporary access permissions granted to a conference participant of the conference participants permanent.

15. The non-transitory computer readable medium of claim 12, wherein the event occurrence is associated with one or both of the digital whiteboard or the conference.

16. An apparatus, comprising:
    a memory; and
    a processor configured to execute instructions stored in the memory to:
       determine, based on a request to share a digital whiteboard with conference participants during a conference provided by a unified communications as a service (UCaaS) platform temporary access permissions to the digital whiteboard for each of the conference participants, wherein the temporary access permissions are specific to each of the conference participants based on previous access permissions granted to each of the conference participants;
       grant the temporary access permissions to enable the conference participants to access the digital whiteboard during the conference; and
       revoke, upon an event occurrence, the temporary access permissions, wherein the event occurrence is uniquely defined for each conference participant according to a set of rules based on the digital whiteboard, each conference participant, and the conference.

17. The apparatus of claim 16, wherein the processor is configured to execute the instructions to:
    access a data store storing digital whiteboard access permissions to determine, based on a list of the conference participants, that the conference participants are without access permissions for the digital whiteboard.

18. The apparatus of claim 16, wherein the processor is configured to execute the instructions to:
    use an application programming interface call to a client application running at a participant device of an owner of the digital whiteboard to obtain a list of conference participants for the conference.

19. The apparatus of claim 16, wherein the temporary access permissions are granted based on whiteboard roles defined for the conference participants.

20. The apparatus of claim 16, wherein the event occurrence corresponds to a disconnection of an owner of the digital whiteboard from the conference.

* * * * *